United States Patent [19]

Timothy et al.

[11] Patent Number: 5,406,489

[45] Date of Patent: Apr. 11, 1995

[54] INSTRUMENT FOR MEASURING AN AIRCRAFT'S ROLL, PITCH, AND HEADING BY MATCHING POSITION CHANGES ALONG TWO SETS OF AXES

[75] Inventors: LaMar K. Timothy, Kaysville; Douglas G. Bowen, Spanish Fork; Michael L. Ownby, Sandy; John D. Timothy, Kaysville, all of Utah

[73] Assignee: Unisys Corporation, Blue Bell, Pa.

[21] Appl. No.: 911,430

[22] Filed: Jul. 10, 1992

[51] Int. Cl.$^6$ ............................................. G06F 15/50
[52] U.S. Cl. ................................... 364/434; 364/559; 364/449; 340/975; 340/979; 342/357
[58] Field of Search ....................... 364/434, 559, 449; 342/357, 451; 340/974, 975, 979

[56] References Cited

U.S. PATENT DOCUMENTS

| | | | |
|---|---|---|---|
| 4,405,986 | 9/1983 | Gray | 364/434 |
| 4,930,085 | 5/1990 | Kleinschmidt | 364/449 |
| 5,101,356 | 3/1992 | Timothy et al. | 364/449 |
| 5,172,323 | 12/1992 | Schmidt | 364/453 |

Primary Examiner—Michael Zanelli
Attorney, Agent, or Firm—Charles J. Fassbender; Mark T. Starr; Stanton D. Weinstein

[57] ABSTRACT

An instrument for indirectly measuring the attitude of a moving aircraft includes three accelerometers, a GPS radio receiver, an electronic estimating module, and an electronic output module. The three accelerometers indicate three accelerations of the aircraft respectively along three aircraft body axes. The GPS radio receiver receives from GPS satellites the position and velocity of the aircraft along an earth fixed axis. The electronic estimating module estimates a vector such that a series of aircraft position changes along the three body axes that are caused by the measured accelerations, times the vector, approximately matches a corresponding series of position changes along the earth fixed axis as given by the receiver. The electronic output module generates a visual display of the roll, pitch, or heading of the aircraft by performing trigonometric functions on the vector.

11 Claims, 4 Drawing Sheets

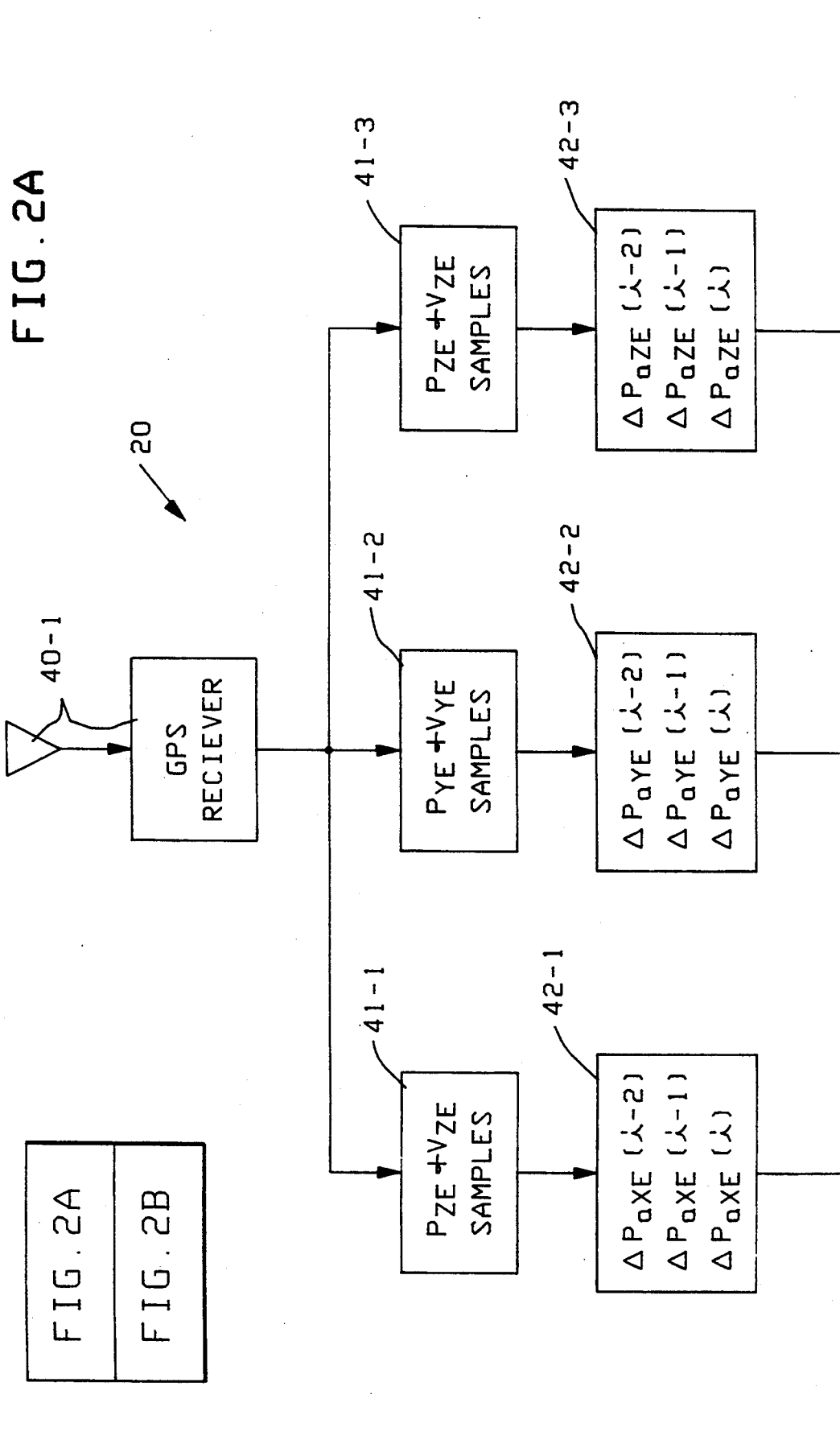

INSTRUMENT FOR MEASURING AN AIRCRAFT'S ROLL, PITCH, AND HEADING BY MATCHING POSITION CHANGES ALONG TWO SETS OF AXES

BACKGROUND OF THE INVENTION

This invention relates to aircraft navigation instruments; and more particularly, it relates to instruments which measure an aircraft's attitude in terms of roll, pitch, and heading.

In the prior art, the instruments which measure an aircraft's roll, pitch and heading have operated on inertial navigation principles. These inertial navigation instruments include three wide angle gyroscopes, and the reactions of the gyroscopes along three axes to the aircraft's movements are measured and translated into roll, pitch, and heading. An example of such an instrument is the LN-100 strap down initial navigation system by Litton Corporation.

A major drawback, however, of the above-described inertial navigation instruments is that they are too expensive to be practicable for use in many kinds of aircraft. Just the three wide angle gyroscopes, by themselves, cost about fifty-sixty thousand dollars. Consequently, in low cost drones that are shot down by the military as targets and in low cost private airplanes, inertial navigation instruments have found very little use.

Another prior instrument for measuring an aircraft's roll, pitch, and heading which operates on a different principle is disclosed is U.S. Pat. No. 5,101,356. Basically, that instrument operates on the principle of an interferometer wherein roll, pitch, and heading are measured by comparing the phases of three radio signals from three GPS receivers that are included in the instrument.

However, in the patent '356 instrument, the three GPS receivers must be separated from each other on the aircraft by as large a distance as possible (e.g.—they are located on the aircraft's nose, tail, and wing). At the same time, the three GPS receives must not move relative to each other. If both constraints are not met, the instrument will give erroneous results. But, in many cases both constraints cannot be met since an aircraft's wings generally will bend or flex during flight.

Accordingly, a primary object of the invention is to provide a novel structure for an instrument which measures the roll, pitch, and heading of an aircraft such that all of the above problems are overcome.

BRIEF SUMMARY OF THE INVENTION

In accordance with the present invention, an instrument which measures the attitude of a moving aircraft has the following make-up.

1. Three accelerometers are mounted on the aircraft such that they indicate three accelerations of the aircraft respectively along three aircraft body axes.

2. A radio receiver is provided which receives from an external source, the position and velocity of the aircraft along an earth fixed axis.

3. An electronic estimating module is coupled to the accelerometers and the receiver, and it estimates a vector such that a series of aircraft position changes along the three body axes that are caused by the measured accelerations, times the vector, approximately matches a corresponding series of position changes along the earth fixed axis as indicated by the receiver.

4. An electronic output module is coupled to the estimating module, and it generates an output signal that indicates the roll, pitch, or heading of the aircraft by performing trigonometric functions on the vector.

With the above instrument, all gyroscopes are eliminated; and, each of the components that are in the instrument (i.e., the accelerometers, the radio receiver, the electronic estimating module, and the output module) are orders of magnitude less expensive than a gyroscope. Also, with the above instrument, the three accelerations need not be separated from each other by large distances. Consequently, the above instrument is both inexpensive and accurate, and that opens up a whole new market which was unreachable by the prior art.

DETAILED DESCRIPTION

Figure 1:
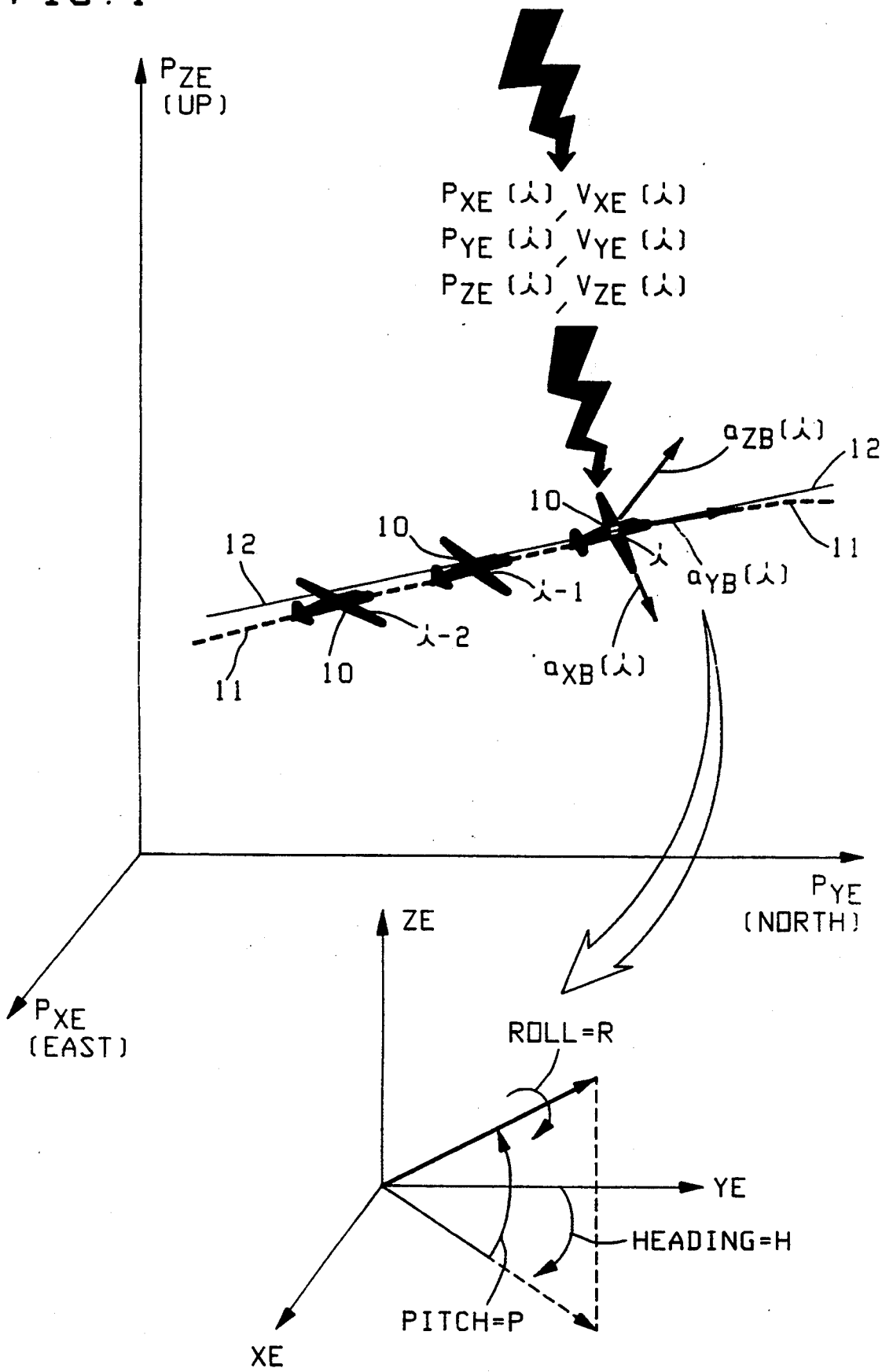
FIG. 1 shows an aircraft which incorporates an instrument that is structured according to the present invention, and it shows some of the input signals which the instrument receives and processes to obtain the aircraft's roll, pitch, and heading.
Figure 2B:
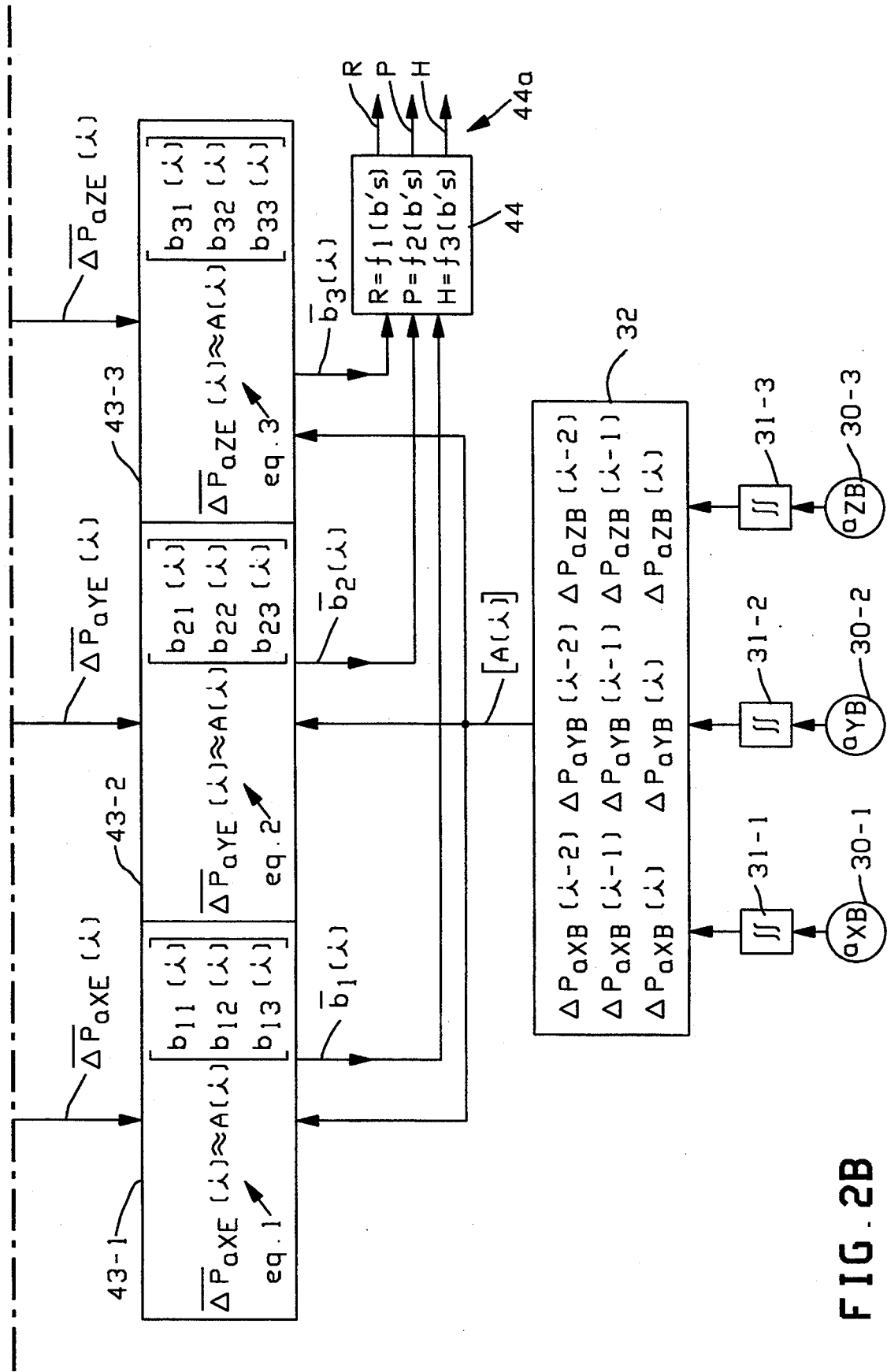
FIG. 2 shows a detailed structure of the instrument in the FIG. 1 aircraft and that structure is a preferred embodiment of the present invention; and, FIG. 3 shows a signal flow diagram which describes the internal operations of the electronic estimating module in FIG. 2.

In order to obtain a detailed understanding of a preferred embodiment of the present invention, reference should now be made to FIGS. 1 and 2. Reference numeral 10 in FIG. 1 shows an aircraft at three consecutive time instants i-2, i-1, and i as the aircraft moves along a curved path 11. At each of those time instants, the aircraft 10 has a certain roll, pitch, and heading (R,P,H); and, FIG. 2 shows the internal structure of an instrument 20 which is on the aircraft 10 and which operates according to the present invention to indirectly measure the aircrafts R, P, H.

These indirect measurements of R, P, H are made by the instrument 20 as a function of two sets of input signals. In FIG. 1, one set of the input signals is shown as $a_{XB}(i)$, $a_{YB}(i)$, and $a_{ZB}(i)$; and, the other set of input signals is shown as $P_{XE}(i)$, $P_{YE}(i)$, $P_{ZE}(i)$, $V_{XE}(i)$, $V_{YE}(i)$, and $V_{ZE}(i)$, where $i = 1, 2, 3, 4$, etc.

Signal $a_{XB}(i)$ indicates the acceleration of the aircraft 10 at time instant "i" in a direction "XB" along the aircraft's wing axis. Likewise, symbol $a_{YB}(i)$ indicates the aircraft's acceleration at time instant "i" in a direction "YB" along the aircraft's body axis and perpendicular to the direction "XB". Signal $a_{ZB}(i)$ indicates the aircraft's acceleration at the instant "i" in a direction "ZB" which is perpendicular to the directions "XB" and "YB". Each of these accelerations is measured by a respective accelerometer that is mounted on the aircraft 10; and, they are shown in FIG. 2 as components 30-1, 30-2, and 30-3.

By comparison, the signals $P_{XE}(i)$, $P_{YE}(i)$ and $P_{ZE}(i)$ respectively indicate the position of the aircraft 10 at time instant "i" along three earth fixed "XE", "YE", and "ZE". Preferably, these earth fixed axis "XE", "YE", and "ZE" respectively are in the directions of East, North, and vertical. Likewise the signals $V_{XE}(i)$, $V_{YE}(i)$, and $V_{ZE}(i)$ respectively indicate the velocity of the aircraft 10 at time instant "i" along the axes "XE", "YE", and "ZE". All of the aircraft's earth fixed positions and velocities are received on the aircraft 10 by a radio receiver from global positioning satellites (GPS) which orbit the earth. This GPS radio receiver is shown in FIG. 2 as item 40-1.

Each of the acceleration signals $a_{XB}(i)$, $a_{XB}(i)$ and $a_{ZB}(i)$ that occur at any particular time instant are doubly integrated over a time interval $\Delta t$, which occurs from time instant "i" to the next time instant "i+1", respectively by three integrator circuits 31-1, 31-2 and 31-3 in FIG. 2. This integration gives the aircraft's change in position due to the measured accelerations along the aircraft's axes XB, YB, and ZB. Then, the results of the three most recent integrations (i.e.—the integrations, starting at times i, i−1, and i−2) are stored as a 3×3 matrix in a memory. In FIG. 2, this memory is identified by reference numeral 32; and the 3×3 matrix is identified by a signal [A(i)]. Signal $\Delta P_{aXB}(i)$ in matrix [A(i)] indicates the aircraft's change in position along its body axis XB from time "i" to "i+1" due to the measured acceleration $a_{XE}(i)$; signal $\Delta P_{aYB}(i)$ indicates the aircrafts change in position along its body axis YB from time "i" to "i+1" due to the measured acceleration $a_{YB}(i)$; etc.

In parallel with the above, the earth referenced position and velocity signals from the radio receiver 40-1 are held in three registers 41-1, 41-2, and 41-3 in FIG. 2. Then, the signals in those registers are operated on by three arithmetic units 42-1, 42-2, and 42-3 to obtain the aircraft's changes in position along the earth fixed axes which are due solely to accelerations other than gravity. In FIG. 2, this change in the aircraft's position from time "i" to time "i+1" along the earth fixed xE axis is indicated by the signal $\Delta P_{aXE}(i)$; this change in the aircraft's position from time "i" to time "i+1" along the earth fixed axis YE is indicated by the signal $\Delta P_{aYE}(i)$; etc.

To obtain the position change $\Delta P_{aXE}(i)$, the arithmetic unit 42-1 makes a subtraction $P_{XE}(i+1) - P_{XE}(i)$, and from that result subtracts the quantity $V_{XE}(i)\Delta t$. Similarly to obtain the position change $\Delta P_{aYE}(i)$, the arithmetic unit 42-2 makes a subtraction $P_{YE}(i+1) - P_{YE}(i)$, and from that result subtracts the quantity $V_{YE}(i)\Delta t$. Lastly to obtain the position change $\Delta P_{aZE}(i)$, the arithmetic unit 42-3 makes a subtraction $P_{ZE}(i+1) - P_{ZE}(i)$, and from that result subtracts the quantity $V_{ZE}(i)\Delta t$ and adds the quantity $\int\int g dt^2$ where g is gravity and the integration occurs over time period $\Delta t$.

Thereafter in FIG. 2, an estimating module 43-1 estimates a 3×1 vector $\bar{b}_1(i)$ which relates the XE earth axis position changes $\Delta P_{aXE}(i)$, $\Delta P_{aXE}(i-1)$, and $\Delta P_{aXE}(i-2)$ to the three body axes position changes as given by the 3×3 matrix [A(i)]. This relation is expressed as equation 1 in module 43-1. In equation 1, the leftmost term $\overline{\Delta P}_{aXE}(i)$ represents the XE earth axis position changes $\Delta P_{aXE}(i)$, $\Delta P_{aXE}(i-1)$, and $\Delta P_{aXE}(i-2)$ when they are arranged in a column as shown in the arithmetic unit 42-1, and the rightmost term is the $\bar{b}_1(i)$ vector.

Similarly, a second estimating module 43-2 estimates a 3×1 vector $\bar{b}_2(i)$ which relates the YE earth axis position changes $\Delta P_{aYE}(i)$, $\Delta P_{aYE}(i-1)$, and $\Delta P_{aYE}(i-2)$ to the 3×3 matrix [A(i)]; and, this relation is given by equation 2 in the module 43-2. Likewise, a third estimating module 43-3 estimates a 3×1 vector $\bar{b}_3(i)$ which relates the ZE earth axis position changes $\Delta P_{aZE}(i)$, $\Delta P_{aZE}(i-1)$, and $\Delta P_{aZE}(i-2)$ to the 3×3 matrix [A(i)]; and, this relation is given by equation 3 in the module 43-3.

In each of the equations 1, 2, and 3, the left hand side is related to the right hand side by an approximately equal sign "≈" rather than an equal sign. That is because, in general, the vectors $\bar{b}_1(i)$, $\bar{b}_2(i)$, and $\bar{b}_3(i)$ change with time each time instant "i"; those vectors $\bar{b}_1(i)$, $\bar{b}_2(i)$, and $\bar{b}_3(i)$ will be constant only when the aircraft travels in a straight path. This approximation is depicted in FIG. 1 wherein the aircraft's approximated straight line path at time instant "i" is shown by reference numeral 12. Such an approximation will be accurate enough to give meaningful results so long as any curves in the aircraft's path remain small over three successive time intervals $\Delta t$.

Once the terms $\overline{\Delta P}_{aXE}(i)$, $\overline{\Delta P}_{aYE}(i)$, $\overline{\Delta P}_{aZE}(i)$, and [A(i)] in the equations 1, 2, and 3 are established, it might seem that the vectors $\bar{b}_1(i)$, $\bar{b}_2(i)$, and $\bar{b}_3(i)$ can be determined by simply multiplying both sides of the equations 1, 2 and 3 the inverse matrix $[A(i)]^{-1}$. But, for many practical cases, the inverse matrix $[A(i)]^{-1}$ does not exists because of singularity problems. For example, when the aircraft is not turning to either side, the center column of the matrix [A(i)] will be all zeros. Also, when the aircraft is not moving up or down, the right most column of the matrix [A(i)] will be all zeros.

To solve this problem, the estimating modules 43-1, 43-2 and 43-3 of FIG. 2 do not attempt to determine the inverse matrix $[A(i)]^{-1}$. Instead, module 43-1 estimates the $\bar{b}_1(i)$ vector by performing all of the operations on $\overline{\Delta P}_{aXE}(i)$ and [A(i)] which are indicated in the flow diagram of FIG. 3. Likewise, module 43-2 estimates the $\bar{b}_2(i)$ vector by performing similar operations on $\overline{\Delta P}_{aYE}(i)$ and [A(i)]; and module 43-3 estimates the $\bar{b}_3(i)$ vector by performing similar operations on $\overline{\Delta P}_{aZE}(i)$ and [A(i)]. Those operations that are performed by module 43-2 can be seen from FIG. 3 by changing all of the "1" subscripts to "2" and changing $\overline{\Delta P}_{aXT}(i)$ to $\overline{\Delta P}_{aYT}(i)$. Those operations that are performed by module 43-3 can be seen from FIG. 3 by changing all of the "1" subscripts to "3" and changing $\overline{\Delta P}_{aXT}(i)$ to $\overline{\Delta P}_{aZT}(i)$.

Figure 3:
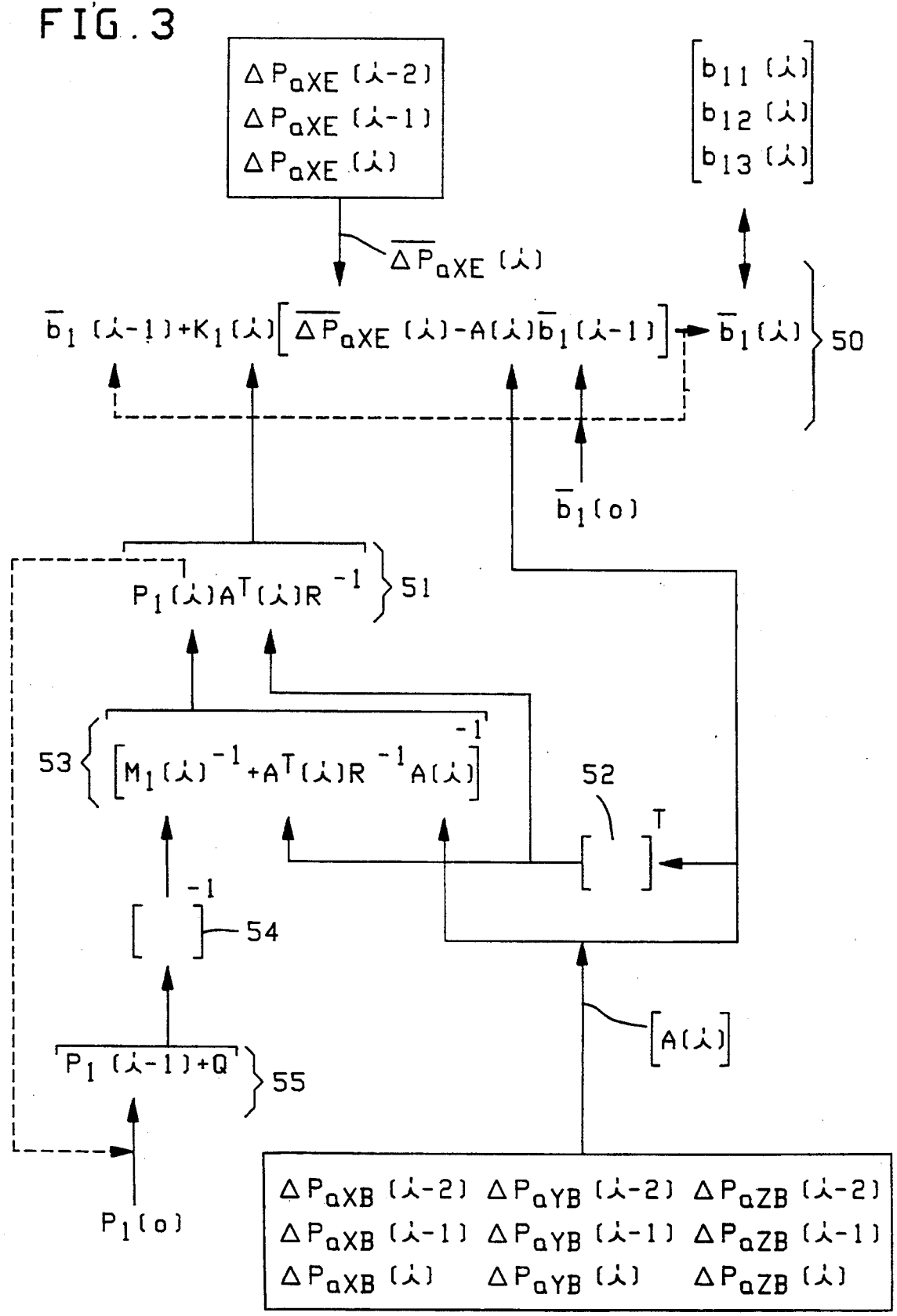

Before going into the details of FIG. 3 flow diagram, consider what happens after the steps of the diagram are carried out and the $\bar{b}_1(i)$, $\bar{b}_2(i)$, $\bar{b}_3(i)$ vectors are thereby estimated. When that occurs, an output module 44 in FIG. 2 uses the $\bar{b}_1(i)$, $\bar{b}_2(i)$, and $\bar{b}_3(i)$ vectors to determine the aircraft's roll, pitch, and heading as trigonometric functions of them. These functions, which are called Euler rotations, are as follows wherein C=cosine, S=sine, R=roll, P=pitch, and H=heading:

| | | |
|---|---|---|
| $b_{11} = SRSPSH + CRCH,$ | $b_{12} = CPSH,$ | $b_{13} = CHSR - CRSPSH,$ |
| $b_{21} = SRSPCH - CRSH,$ | $b_{22} = CPCH,$ | $b_{23} = -(CRCHSP + SRSH),$ |
| $b_{31} = -CPSR.$ | $b_{32} = SP.$ | $b_{33} = CRCP.$ |

Preferably, the output module 44 determines the aircrafts R, P, H by utilizing just the terms $b_{32}$, $b_{31}$, $b_{12}$, and $b_{22}$ as shown below; and thereafter provides a visual digital display 44a of those R, P, H values.

$$P = \sine^{-1}(b_{32})$$

-continued $$R = \text{sine}^{-1}\left(\frac{-b_{31}}{\cos P}\right)$$

$$H = \text{sine}^{-1}\left(\frac{b_{12}}{\cos P}\right)$$

for $-45° \leq H \leq 45°$
and $135° \leq H \leq 225°$ $$H = \cos^{-1}\left(\frac{b_{22}}{\cos P}\right)$$

for $45° \leq H \leq 135°$
and $+223° \leq H \leq 315°$

Turning now to FIG. 3, the details of the estimating module 43-1 will be described. As inputs, at each time instant "i", this module 43-1 receives the signals $\overline{\Delta P}_{aXE}(i)$ and $[A(i)]$. In response to those inputs, module 43-1 estimates the $\bar{b}_1(i)$ vector such that $\overline{\Delta P}_{aXE}(i) \approx [A(i)]\bar{b}_1(i)$. This estimate is made by module 43-1 by performing all of the signal processing operation that are identified in FIG. 3 by reference numerals 50–55. Those operations 50–55 can be performed even when input signals $\overline{\Delta P}_{aXE}$ and/or $[A(i)]$ contain any number of zeros or singularities because they do not include finding the inverse matrix $[A(i)]^{-1}$.

Operation 50 is a recursive operation wherein a previously estimated vector $\bar{b}_1(i-1)$ is modified to obtain the next estimated vector $\bar{b}_1(i)$. To start this recursive operation, an initial estimate of the vector $\bar{b}_1(0)$ is made by evaluating the trigonometric functions that were given above for a known initial R, P, H of the aircraft. For example, if the aircraft 10 is initially sitting on a runway and pointing due North, then $b_{11}(0) = SRSPSH + CRCH = 1$, $b_{12}(0) = CPSH = 0$, and $b_{13}(0) = CHSR - CRSPSH = 0$.

Also, as operation 50 shows, the modification which is made to the previously estimated vector $\bar{b}_1(i-1)$ is to add a term $K_1(i)[\overline{\Delta P}_{aXE}(i) - A(i)\bar{b}_1(i-1)]$. In this term, the factor $K_1(i)$ is a $3 \times 3$ gain matrix, and that gain matrix is multiplied by an "error" that results if the previous estimate $\bar{b}_1(i-1)$ were used as the new estimate $\bar{b}_1(i)$. In other words, $\overline{\Delta P}_{aXE}(i) - A(i)\bar{b}_1(i)$ is approximately zero, but $\Delta P_{aXE}(i) - A(i)b_1(i-1)$ is not and represents an error.

To obtain the $3 \times 3$ gain matrix $K_1(i)$, operation 51 is performed. There, the term $A^T(i)$ is the transpose of the matrix $A(i)$, and that transpose is performed by operation 52. Also, the term $R^{-1}$ is a constant $3 \times 3$ matrix which is obtained by taking the inverse of a $3 \times 3$ covariance matrix R of the errors in the GPS signals. For example, if the GPS position signals are each in error by six feet, then R a $3 \times 3$ matrix with $6^2$ on the diagonal and zero for the off diagonal terms.

Further, to obtain the term $P_1(i)$ in operation 51, another operation 53 must be performed. In operation 53, the terms $A^T(i)$, $R^{-1}$ and $A(i)$ are all as explained above; and, the only new term is $M_1(i)^{-1}$. This term $M_1(i)^{-1}$ is obtained by performing an inverse operation 54 on a $3 \times 3$ matrix $M(i)$, and the matrix $M(i)$ is obtained by the final operation 55.

In operation 55, the term Q is a $3 \times 3$ covariance matrix of the accelerometer errors. For example, if each of the accelerometers 30-1 thru 30-3 has an accuracy of 0.5 feet per second$^2$, then the diagonal terms of the matrix Q are $(0.5)^2$ and the off diagonal terms are all zero. Lastly, term $P_1(i-1)$ is recursively formed from term $P_1(i)$ of operation 51. To start this recursive operation, $P_1(0)$ is obtained as a $3 \times 3$ matrix of the uncertainties of the initially estimated $\bar{b}_1(0)$ vector. For example, if the initial uncertainty of R, P, H is each 10°, then: the initial uncertainty of $b_{11}$ is $(C10° \ S10° \ S10° + C10° \ C10°)^2$; the initial uncertainty of $b_{12}$ is $(C10° \ S10°)^2$; and the initial uncertainty of $b_{13}$ is $(C10° \ S10° - C10° \ S10° \ S10°)^2$. Those terms from the diagonal of $P_1(0)$, and the off diagonal terms are all zero.

One preferred embodiment of the invention has now been described in detail. In addition, however, many changes and modifications can be made to this embodiment without departing from the nature and spirit of the invention.

For example, if it is only necessary to measure the pitch and/or roll of the aircraft, then several of the modules in FIG. 2 can be eliminated. Specifically, the modules that can be eliminated are 41-1, 42-1, 43-1, 41-2, 42-2, and 43-2. With the remaining modules, the vector $\bar{b}_3(i)$ is estimated. Then from $\bar{b}_3(i)$, the pitch P is determined as $\text{sine}^{-1}(b_{32})$ and roll is determined as $$R = \text{sine}^{-1}\left(\frac{-b_{31}}{\cos P}\right).$$

Similarly, if it is only necessary to measure heading with a reduced accuracy, then in FIG. 2 the modules 41-1, 42-1, and 43-1 can be eliminated. In that case, heading is measured as $$H = \cos - 1\left(\frac{-b_{31}}{\cos P}\right)$$

for all angles of H. Alternatively, modules 41-2, 42-2, and 43-2 can be eliminated, and heading is measured $$H = \text{sine}^{-1}\left(\frac{-b_{12}}{\cos P}\right)$$

for all angles of H.

As still another modification, the number of rows in the FIG. 2 terms $\overline{\Delta P}_{aXE}(i)$, $\overline{\Delta P}_{aYE}(i)$, $\overline{\Delta P}_{aZE}(i)$, $[A(i)]^{-1}$ can be increased to more than three. For example, each such term can each include five rows that have indexes "i", "i−1", "i−2", "i−3", and "i−4". However, to keep the processing of the terms $\overline{\Delta P}_{aXE}(i)$, $\overline{\Delta P}_{aYE}(i)$, $\overline{\Delta P}_{aZE}(i)$, $[A(i)]^{-1}$ from being too time consuming, they preferably are limited to ten rows each.

As yet another modification, the accelerometers 30-1, 30-2, and 30-3 of FIG. 2 can be implemented with any one of several physical structures. For example, each accelerometer can include a strain gauge as a transducer wherein aircraft acceleration along a certain body axis produces a mechanical strain in the gauge which alters the flow of current through it. Alternatively, each accelerometer can include a piezoelectric crystal as a transducer wherein aircraft acceleration is a certain body axis produces a strain on the crystal which alters the frequency of its oscitation. For these implementations, the cost of each accelerometer is only about twenty dollars.

As another modification, the estimating modules 43-1, 43-2, and 43-3 can be implemented with a variety of electrical circuitry. For each example, each such module can be structured as a special purpose sequential digital logic circuit. How to construct a sequential logic circuit from digital logic gates and registers is taught by the textbook "Fundamentals of Logic Design", published by West Publishing Co., Copyright 1979, author C. H. Roth, Jr.

Alternatively, estimating the modules 43-1, 43-2, and 43-3 can be implemented as a general purpose microprocessor which runs a special purpose estimating program. Such a program would receive as inputs, the terms $\overline{\Delta P}_{aXE}(i)$, $\overline{\Delta P}_{aYE}(i)$, $\overline{\Delta P}_{aZE}(i)$, $[A(i)]^{-1}$ from the radio receiver and the accelerometers, and would generate as outputs the vectors $\overline{b}_1(i)$, $\overline{b}_2(i)$, and $\overline{b}_3(i)$ by carrying out all of the FIG. 3 operations.

Similarly, the output module 44 can be implemented as a combinational logic circuit. Alternatively, the inverse sine and cosine operations that yield R, P, and H can be achieved simply by two read-only memories wherein, the term $b_{32}$, $-b_{31}/cosP$, $b_{13}/cosP$, and $b_{22}/cosP$ are sent as a memory address, and from which the inverse sine and inverse cosine terms are read.

Accordingly, it is to be understood that the invention is not limited to just the illustrated preferred embodiment but is defined by the appended claims.

What is claimed is:

1. An instrument for indirectly measuring the attitude of a moving aircraft; said instrument comprising:
    three accelerometers mounted on said aircraft such that they indicate three accelerations of said aircraft respectively along three aircraft body axes;
    a radio receiver in said aircraft which receives from an external source, the position and velocity of said aircraft along an earth fixed axis;
    an electronic estimating module, coupled to said accelerometers and said receiver, which a) estimates a vector such that a series of aircraft position changes along said three body axes that are caused by said measured accelerations, times said vector, approximately match a corresponding series of position changes along said earth fixed axis as indicated by said receiver, and b) estimates said vector in a recursire fashion such that the vector estimates at time instant "i" is a modification of the preceding vector estimate at time instant i−1; and,
    an electronic output module, coupled to said estimating module, which generates an output signal that indicates the roll, pitch, or heading of said aircraft by performing trigonometric functions on said vector.

2. An instrument according to claim 1 wherein said modification is of the form:

$$\overline{b}(i)=\overline{b}(i-1)+K[\overline{\Delta P}_{aE}(i)-A(i)\overline{b}(i-1)]$$

where
   $\overline{b}(i)$ is an estimate of said vector at time instant "i";
   $\overline{b}(i-1)$ is a preceding estimate of said vector at time instant "i−1";
   $\overline{\Delta P}_{aE}(i)$ is said series of position changes along said earth fixed axis;
   $A(i)$ is said series of position changes along said three aircraft body axes; and,
   K is a gain matrix.

3. An instrument according to claim 2 wherein said electronic estimating module is a special purpose sequential digital logic circuit.

4. An instrument according to claim 2 wherein said electronic estimating module is a programmable general purpose microprocessor with a special purpose estimating program.

5. An instrument according to claim 1 wherein said series of position changes consists of exactly three position changes per axis.

6. An instrument according to claim 1 wherein said series of position changes consists of from three to ten position changes per axis.

7. An instrument according to claim 1 wherein each position change of said series occurs during a time interval of from one-half to two seconds.

8. An instrument according to claim 1 wherein said radio receiver receives the position and velocity of said aircraft along multiple earth fixed axes; and, said estimating module estimates a vector for each earth fixed axis such that a series of aircraft position changes along said three body axis times a respective one of said vectors approximately matches a series of position changes along a corresponding one of said earth fixed axes.

9. An instrument according to claim 1 wherein said accelerometers are mounted on said aircraft such that they measure accelerations in the direction of the aircraft's nose and the aircraft's wing and another axis which is perpendicular thereto.

10. An instrument according to claim 1 wherein each of said accelerometers is selected from a group which consists of a strain gauge accelerometer and a piezoelectric accelerometer.

11. An instrument according to claim 1 wherein said radio receiver has an input which receives said position and velocity of said aircraft along said earth fixed axis from global positioning satellites in orbit around the earth.

* * * * *